3,281,401
POLYMERIZATION UTILIZING A TERTIARY
AMINE ADJUVANT
Arthur A. Harban and Charles W. Moberly, Bartlesville,
Okla., assignors to Phillips Petroleum Company, a corporation of Delaware
No Drawing. Filed July 17, 1963, Ser. No. 295,833
4 Claims. (Cl. 260—93.7)

This invention relates to a method and catalyst system for producing polymers of unsaturated compounds. In one aspect this invention relates to a method for producing polyolefins at an increased rate by the use of selected tertiary amines as catalyst adjuvants. In another aspect this invention relates to an improved catalyst system for increasing the rate of production of polyolefins by having incorporated therein selected tertiary amines as catalyst adjuvants.

Mass polymerization of propylene in the presence of a catalyst system comprising diethylaluminum chloride and titanium trichloride has heretofore been disclosed, and it is known that various amines, when incorporated in the catalyst, serve as adjuvants therefor, acting beneficially by reducing the formation of low molecular weight amorphous polymers in the product. It has also been shown that in many instances tertiary amines are particularly effective in this respect. However, when so operating it has been observed that catalyst productivity is not increased and frequently is lowered below levels obtained in the absence of the adjuvant.

It is an object of this invention to provide a process wherein polymerization is carried out at an increased rate.

Another object of this invention is to provide a catalyst system whereby a polymerization process is carried out at an increased rate.

Other objects, features and the several advantages of the invention will be readily apparent to those skilled in the art from a study of the following disclosure and the appended claims.

We have now discovered that compounds selected from the group consisting of N,N,N',N'-tetraalkyldiaminodiphenyls and methylidyne-tris(N,N-dialkylanilines), when combined with the catalyst in an amount in the range of 0.05 to 15, preferably between 0.075 and 5.0 mols per mol of transition metal component or reaction product of titanium tetrachloride and aluminum, provide substantially increased rates of polymer production.

It was an unexpected discovery that while the particular compounds of this invention are of the tertiary amine type, their presence in the catalyst system increases reaction rate, a phenomenon not observed with tertiary amines heretofore employed.

The compounds of the invention are materials which can be identified by the following structural formulas:

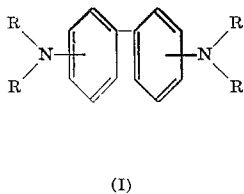

(I)

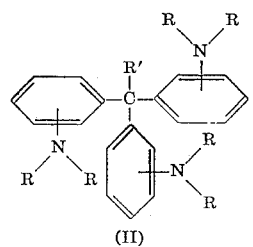

(II)

in which each R is selected from the group consisting of alkyl radicals containing from 1 to 4 carbon atoms and R' is selected from the group consisting of hydrogen and alkyl radicals containing from 1 to 4 carbon atoms. Specific compounds typical of Formula I are N,N,N',N'-tetramethylbenzidine,
N,N,N',N'-tetraethylbenzidine,
N,N,N',N'-tetraisopropylbenzidine,
N,N,N',N'-tetra-tert-butylbenzidine,
N,N,N',N'-tetramethyl-2,2'-diaminodiphenyl,
N,N,N',N'-tetraethyl-2,4'-diaminodiphenyl,
N,N,N',N'-tetra-n-propyl-2,3'-diaminodiphenyl,
N,N,N',N'-tetraisopropyl-3,3'-diaminodiphenyl,
N,N,N',N'-tetra-n-butyl-3,4'-diaminodiphenyl, and the like. Compounds corresponding to Formula II include 4,4',4''-methylidyne-tris(N,N-dimethylaniline),
4,4',4''-methylidyne-tris(N,N-diethylaniline),
4,4',4''-methylidyne-tris(N,N-diisopropylaniline),
4,4',4''-methylidyne-tris(N,N-di-tert-butylaniline),
2,3',4''-methylidyne-tris(N,N-dimethylaniline),
2,4',4''-methylidyne-tris(N,N-diethylaniline),
2,3',3''-methylidyne-tris(N,N-n-propylaniline),
3,3',3''-methylidyne-tris(N,N-isopropylaniline),
3,3',4''-methylidyne-tris(N,N-n-butylaniline),
3,4',4''-methylidyne-tris(N,N-tert-butylaniline),
ethyl-4,4',4''-methylidyne-tris(N,N-dimethylaniline),
isopropyl-2,3',4''-methylidyne-tris(N,N-diisopropylaniline),
n-butyl-2,3',3''-methylidyne-tris(N,N-diethylaniline),
and the like.

The invention is broadly applicable to the polymerization of olefins corresponding to the formula

R—CH=CH$_2$ wherein R is selected from the group consisting of an alkyl radical containing from 1 to 4, inclusive, carbon atoms. Preferred olefins polymerized by the method of this invention include propylene, 1-butene, 1-pentene, 4-methyl-1-pentene, and the like.

The polymerization process of the invention is conducted in the presence of the well-known coordination catalyst system comprising two or more components wherein one component is an organometal compound, including compounds where one or more, but not all, organo groups are replaced by halogen, a metal hydride, or a metal of Groups I, II or III, and the second component is a Group IV, V, VI or VIII (Mendeleef's Periodic System) metal compound. The organometal compounds referred to include, without limitation, alkyl, cycloalkyl, or aryl compounds of mono-, di-, or trivalent metals, particularly aluminum, gallium, indium, beryllium, sodium, potassium, rubidium, cesium, magnesium, cadmium, mercury, zinc, barium or such organometal compounds where one or more but not all of the alkyl, cycloalkyl, or aryl groups is replaced by a hydrogen atom and/or a halogen atom. The organo groups can be quite large, compounds being applicable which have 15 or more carbon atoms in each alkyl, cycloalkyl or aryl group, and 40 carbon atoms or more in the molecule. Specific examples of such organometal compounds include trimethylaluminum, triethylaluminum, triisobutylaluminum, a mixture of diethylaluminum chloride and ethylaluminum halides (where the catalyst also includes another metal compound such as a titanium compound), a halogen, a hydrogen halide, an organophosphorus-containing compound, and a peroxide.

The invention is particularly advantageous when the amine is employed in conjunction with an initiator system comprising an alkylaluminum and a titanium trihalide, for example, a trialkylaluminum or a dialkylaluminum halide plus a titanium halide, such as titanum trichloride.

The preferred initiator system, particularly in the mass polymerization of propylene, comprises a dialkylaluminum halide, more preferably a dialkylaluminum chloride, e.g. diethylaluminum chloride and the reaction product of titanium tetrachloride and aluminum having the approximate formula $TiCl_3 \cdot \frac{1}{3} AlCl_3$.

The ratio of the catalyst components employed in the present process can be varied rather widely depending upon the particular monomer employed and the operation conditions. The mol ratio of the organometal compound, metal hydride or metal of Group I, II or III metal to the Group IV, V, VI or VIII metal compound is usually in the range of 1:1 and 10.1 with a preferred range of 2:1 and 5:1. The concentration of catalyst in the polymerization zone is usually in the range of 0.01 to 5 weight percent based on the monomer charged to that zone although lesser or greater amounts can be employed.

The amount of the amine employed is in the range of between about 0.05 and about 15, preferably between about 0.075 and about 5 mols per mole of Group IV, V VI or VIII metal compound. Conveniently, the amine is charged to the polymerization zone along with the catalyst frequently as a solution in a hydrocarbon solvent, although it is acceptable to charge the amine with either of the catalyst components or their admixture.

The adjuvant can be charged to the reactor with the transition metal component, ball milled therewith if desired, or as a solution in a suitable solvent therefor. It also can be charged as a separate ingredient added before or after the catalyst ingredients. After charging the catalyst and the adjuvant, the propylene monomer is introduced and polymerization initiated at a temperature in the range of between 100° and 140° F. While not essential, it is presently preferred to conduct the polymerization in the presence of elemental hydrogen as disclosed in copending application Serial No. 249,118, suitably charged before or together with the monomer. It also is generally preferred to employ as the heavy metal component of the catalyst the reaction product of titanium tetrachloride and aluminum having the approximate formula $TiCl_3 \cdot \frac{1}{3} AlCl_3$.

The polymerization of the 1-olefin with the catalyst and adjuvant of the invention can be conducted by any suitable means such as a solution process or the mass procedure, and under conditions well known to those skilled in the art. As is known to those skilled in the art, the polymerization of the alpha-olefins can be conducted in the presence of a hydrocarbon diluent which is inert and liquid under the conditions of the process and does not have a deleterious effect on the catalyst. Suitable diluents include paraffinic, cycloparaffinic, and/or aromatic hydrocarbons. Examples of such diluents include propane, butane, pentane, hexane, cyclohexane, methylcyclohexane, benzene, toluene, the xylenes and the like. The relative amounts of diluent and olefin employed in the polymerization depend upon the particular conditions or techniques used and are generally governed by the capacity of the apparatus to effect suitable agitation and heat removal. The polymerization can be conducted at a temperature varying over a rather broad range, for example, at a temperature of —100° to 500° F. In general, pressures are satisfactory which are sufficient to maintain the reaction mixture substantially in the liquid phase.

Although the invention is not to be limited thereby, one particularly preferred method is the so-called mass polymerization system wherein the monomer, preferably the propylene, is liquefied and contacted in the reaction zone with a two- or more component initiator system discussed hereinbefore, preferably in the presence of hydrogen. When employing propylene as the monomer and diluent, a suitable temperature is in the range of about 0 to 250° F.

The process of the invention can be carried out as a batch process, e.g. by pressuring the olefin to be polymerized into a reactor containing a catalyst system, the adjuvant and the diluent. Furthermore, the process can be conducted continuously by maintaining the reactants in the reactor for a suitable residence time. The residence time employed in the continuous process can vary widely since it depends to a great extent upon the temperature and the specific olefin. However, the residence time in a continuous process generally falls within the range of 1 second to 5 hours or more. In a batch process, the reaction time can also vary widely, such as from 15 minutes to 24 hours or more.

The treatment of the polymerizate subsequent to the polymerization step depends upon the type of process employed for the polymerization. For example, in a solution process upon completion of the polymerization, by one suitable method any excess olefin is vented and the contents of the reactor are treated so as to inactivate the catalyst and remove the catalyst residue. The polymer is then precipitated and separated from the diluent by decantation, filtration, or other suitable method, after which the polymer is dried.

The following example will further illustrate the invention.

*Example*

A series of runs was made in which propylene was polymerized in the presence of a catalyst consisting of diethylaluminum chloride and the reaction product of titanium tetrachloride and aluminum having the approximate formula $TiCl_3 \cdot \frac{1}{3} AlCl_3$. These runs were made in a 1-liter stainless steel reactor to which was first charged the aforesaid reaction product, followed by the desired amount of adjuvant. The diethylaluminum chloride was then added and the reactor closed, after which hydrogen (1.25 mol percent based on the propylene) was introduced from a calibrated system. Liquid propylene (150 grams) was then charged and the reaction conducted at 130° F. for 2.5 hours, after which unreacted propylene was vented. The polymer was recovered, treated with methanol to inactivate the catalyst, sprayed with an acetone solution of dilaurylthiodipropionate and Geigy RA–565 (a substituted triazine) as antioxidant, dried in a vacuum oven at 80° C., and weighed. Data on these runs are given in the following tabulation:

| Run No. | DEAC (gr.) | RP [a] (gr.) | Adjuvant | | Productivity (gr./gr./RP) | Increase Percent Over Control |
| --- | --- | --- | --- | --- | --- | --- |
| | | | Compound | (Gr.) | | |
| 1 | 0.226 | 0.097 | I [b] | 0.0096 | 1,004 | 17 |
| 2 | 0.228 | 0.098 | II [c] | 0.0605 | 1,161 | 35.2 |
| 3 | 0.234 | 0.100 | II [c] | 0.0151 | 1,103 | 28.4 |
| 4 | 0.243 | 0.104 | III [d] | 0.0199 | 720 | —16.2 |
| 5 | 0.234 | 0.104 | None | | 869 | |

[a] Reaction product of titanium tetrachloride and aluminum having approximate formula $TiCl_3 \cdot \frac{1}{3} AlCl_3$.
[b] N,N,N',N'-tetramethylbenzidine.
[c] 4,4',4"-methylidyne-tris(N,N-dimethylaniline).
[d] Triphenylamine.

These data show that adjuvants of the invention provide increases in productivity ranging from 17 to 35 percent while a typical tertiary amine led to a reduction of over 16 percent when compared with the control.

Various modifications of this invention are possible in view of the foregoing disclosure and discussion without departing from the spirit or scope thereof.

We claim:
1. A process for increasing the rate of polymerization of propylene in the presence of a catalyst formed by commingling diethylaluminum chloride and the reaction product of titanium tetrachloride and aluminum having the approximate formula TiCl₃·⅓AlCl₃ which comprises conducting said polymerization in the presence of said catalyst having added thereto a tertiary amine adjuvant of the formula

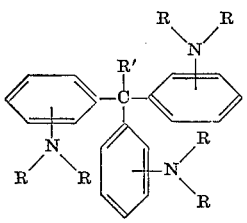

wherein R is selected from the group consisting of alkyl radicals containing from 1 to 4 carbon atoms and R' is selected from the group consisting of hydrogen and alkyl radicals containing from 1 to 4 carbon atoms.

2. The process of claim 1 wherein said amine is 4,4',4''-methylidyne-tris(N,N-dimethylaniline).

3. A catalyst system which forms on mixing (a) diethylaluminum chloride, (b) the reaction product of titanium tetrachloride and aluminum having the approximate formula TiCl₃·⅓AlCl₃, and (c) a tertiary amine adjuvant of the formula

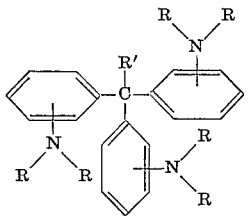

wherein R is selected from the group consisting of alkyl radicals containing from 1 to 4 carbon atoms and R' is selected from the group consisting of hydrogen and alkyl radicals containing from 1 to 4 carbon atoms.

4. The catalyst system of claim 3 wherein said amine is 4,4',4''-methylidyne-tris(N,N-dimethylaniline).

References Cited by the Examiner

UNITED STATES PATENTS 3,055,878   9/1962   Janoski _____ 260—94.9

FOREIGN PATENTS 867,139   5/1961   Great Britain.

JOSEPH L. SCHOFER, *Primary Examiner.*

F. L. DENSON, *Assistant Examiner.*